United States Patent
Lee et al.

(10) Patent No.: US 7,620,467 B2
(45) Date of Patent: Nov. 17, 2009

(54) DEVICE AND METHOD FOR METADATA MANAGEMENT

(75) Inventors: Ji-hyun Lee, Suwon-si (KR); Du-il Kim, Suwon-si (KR); Kil-su Eo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 438 days.

(21) Appl. No.: 10/559,432

(22) PCT Filed: Mar. 16, 2004

(86) PCT No.: PCT/KR2004/000553

§ 371 (c)(1),
(2), (4) Date: Dec. 5, 2005

(87) PCT Pub. No.: WO2004/109698

PCT Pub. Date: Dec. 16, 2004

(65) Prior Publication Data

US 2006/0130117 A1   Jun. 15, 2006

(30) Foreign Application Priority Data

Jun. 4, 2003   (KR) .................. 10-2003-0036036

(51) Int. Cl.
*G06F 17/00* (2006.01)
(52) U.S. Cl. ....................... 700/94; 715/716; 725/40
(58) Field of Classification Search ............ 700/94
See application file for complete search history.

(56) References Cited

U.S. PATENT DOCUMENTS 5,864,868 A   1/1999   Contois (Continued)

FOREIGN PATENT DOCUMENTS

JP   2000-251486 A   9/2000

(Continued)

OTHER PUBLICATIONS

Curtis, K. et al., "Multimedia content management-provision of validation & personalization services", In: IEEE, British Telecom Res. Labs, Ipswich, UK, Jun. 7-11, 1999, vol. 2, pp. 302-306.

*Primary Examiner*—Curtis Kuntz
*Assistant Examiner*—Paul McCord
(74) *Attorney, Agent, or Firm*—Sughrue Mion, PLLC

(57) ABSTRACT

The present invention relates to a device and method for managing metadata. A principal object of the present invention is to provide a device and method for managing metadata by which only key metadata can be selected and provided in accordance with their priorities upon playback of audio content by defining attributes of key metadata according to characteristics of the audio content. To achieve this object of the present invention, there is provided a method of managing metadata, comprising the steps of assigning priorities to attributes of key metadata according to characteristics of audio contents, reading the metadata for a specific audio content, extracting the attributes of respective metadata from the read metadata, classifying the extracted metadata attributes according to the assigned priorities and setting their priorities, and displaying the metadata for the audio content according to the set priorities. According to the present invention, there is an advantage in that major information on respective audio content can be efficiently provided to a user based on the metadata that are classified and selected according to the respective audio content.

14 Claims, 4 Drawing Sheets

U.S. PATENT DOCUMENTS

| | | | |
|---|---|---|---|
| 6,088,722 A * | 7/2000 | Herz et al. | 709/217 |
| 6,092,049 A * | 7/2000 | Chislenko et al. | 705/10 |
| 6,154,600 A | 11/2000 | Newman et al. | |
| 6,390,430 B1 | 5/2002 | Hawley | |
| 6,489,969 B1 | 12/2002 | Garmon et al. | |
| 6,526,411 B1 * | 2/2003 | Ward | 707/102 |
| 6,545,209 B1 * | 4/2003 | Flannery et al. | 84/609 |
| 6,728,729 B1 * | 4/2004 | Jawa et al. | 707/104.1 |
| 6,748,395 B1 * | 6/2004 | Picker et al. | 707/102 |
| 6,941,324 B2 * | 9/2005 | Plastina et al. | 707/104.1 |
| 6,963,975 B1 * | 11/2005 | Weare | 713/176 |
| 7,003,515 B1 * | 2/2006 | Glaser et al. | 707/5 |
| 7,312,785 B2 * | 12/2007 | Tsuk et al. | 345/156 |
| 2002/0045960 A1 | 4/2002 | Phillips et al. | |
| 2002/0088011 A1 | 7/2002 | Lamkin et al. | |
| 2002/0099696 A1 * | 7/2002 | Prince | 707/3 |
| 2002/0099731 A1 * | 7/2002 | Abajian | 707/500 |
| 2002/0099737 A1 * | 7/2002 | Porter et al. | 707/513 |
| 2002/0103920 A1 * | 8/2002 | Berkun et al. | 709/231 |
| 2002/0136531 A1 | 9/2002 | Harradine et al. | |
| 2002/0184622 A1 * | 12/2002 | Emura et al. | 725/34 |
| 2003/0021055 A1 | 1/2003 | Tange et al. | |
| 2003/0028273 A1 * | 2/2003 | Lydecker et al. | 700/94 |
| 2003/0050784 A1 * | 3/2003 | Hoffberg et al. | 704/270.1 |
| 2003/0122966 A1 | 7/2003 | Markman et al. | |
| 2003/0135513 A1 * | 7/2003 | Quinn et al. | 707/102 |
| 2003/0217121 A1 * | 11/2003 | Willis | 709/219 |
| 2003/0236582 A1 * | 12/2003 | Zamir et al. | 700/94 |
| 2004/0059705 A1 * | 3/2004 | Wittke et al. | 707/1 |
| 2004/0172593 A1 * | 9/2004 | Wong et al. | 715/512 |
| 2004/0177063 A1 * | 9/2004 | Weber et al. | 707/3 |
| 2004/0194128 A1 * | 9/2004 | McIntyre et al. | 725/32 |
| 2005/0027687 A1 * | 2/2005 | Nowitz et al. | 707/3 |
| 2006/0047678 A1 * | 3/2006 | Miyazaki et al. | 707/102 |

FOREIGN PATENT DOCUMENTS

| | | |
|---|---|---|
| JP | 2000-333126 A | 11/2000 |
| JP | 2001-101837 A | 4/2001 |
| JP | 2001-197431 A | 7/2001 |
| JP | 2001-298676 A | 10/2001 |
| JP | 2002-152677 A | 5/2002 |
| KR | 1997-0050918 A | 7/1997 |
| KR | 2002-0062921 A | 7/2002 |
| KR | 10-2003-0036036 A | 5/2003 |
| KR | 10-2004-0007615 A | 1/2004 |
| WO | WO 00/45600 A1 | 8/2000 |
| WO | 02/41579 A1 | 5/2002 |
| WO | WO 2098130 A2 * | 12/2002 |

* cited by examiner

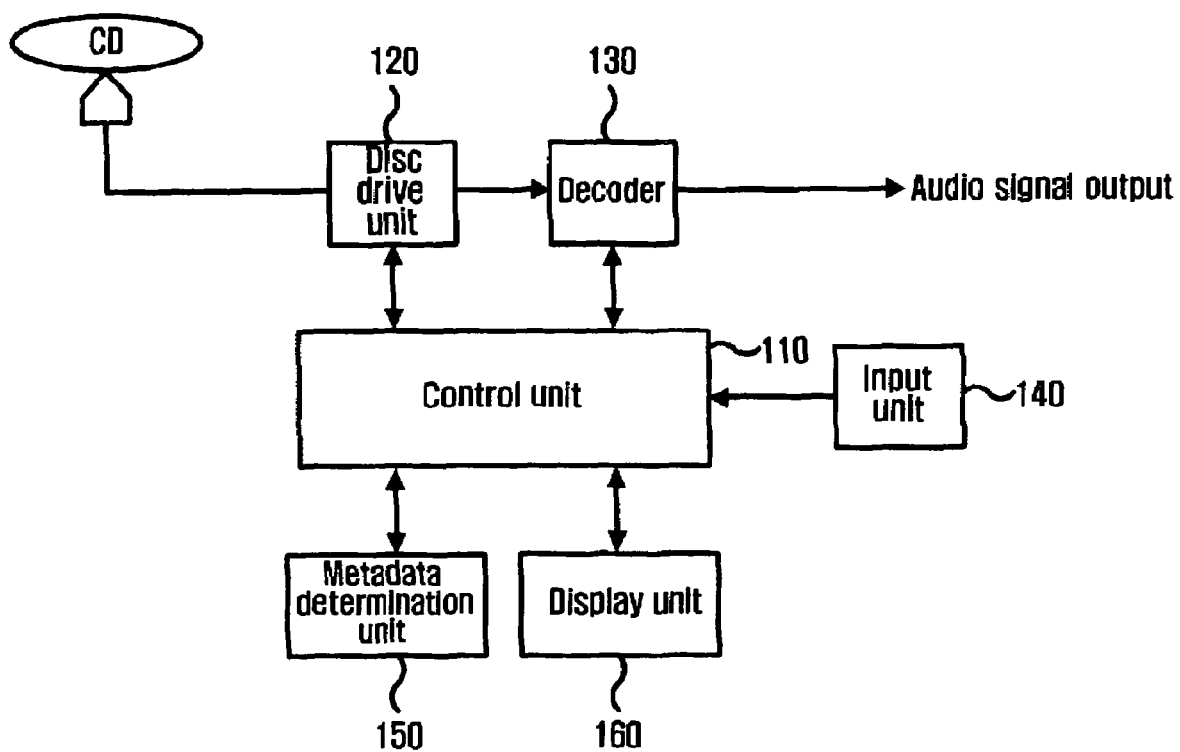

[Fig. 2]
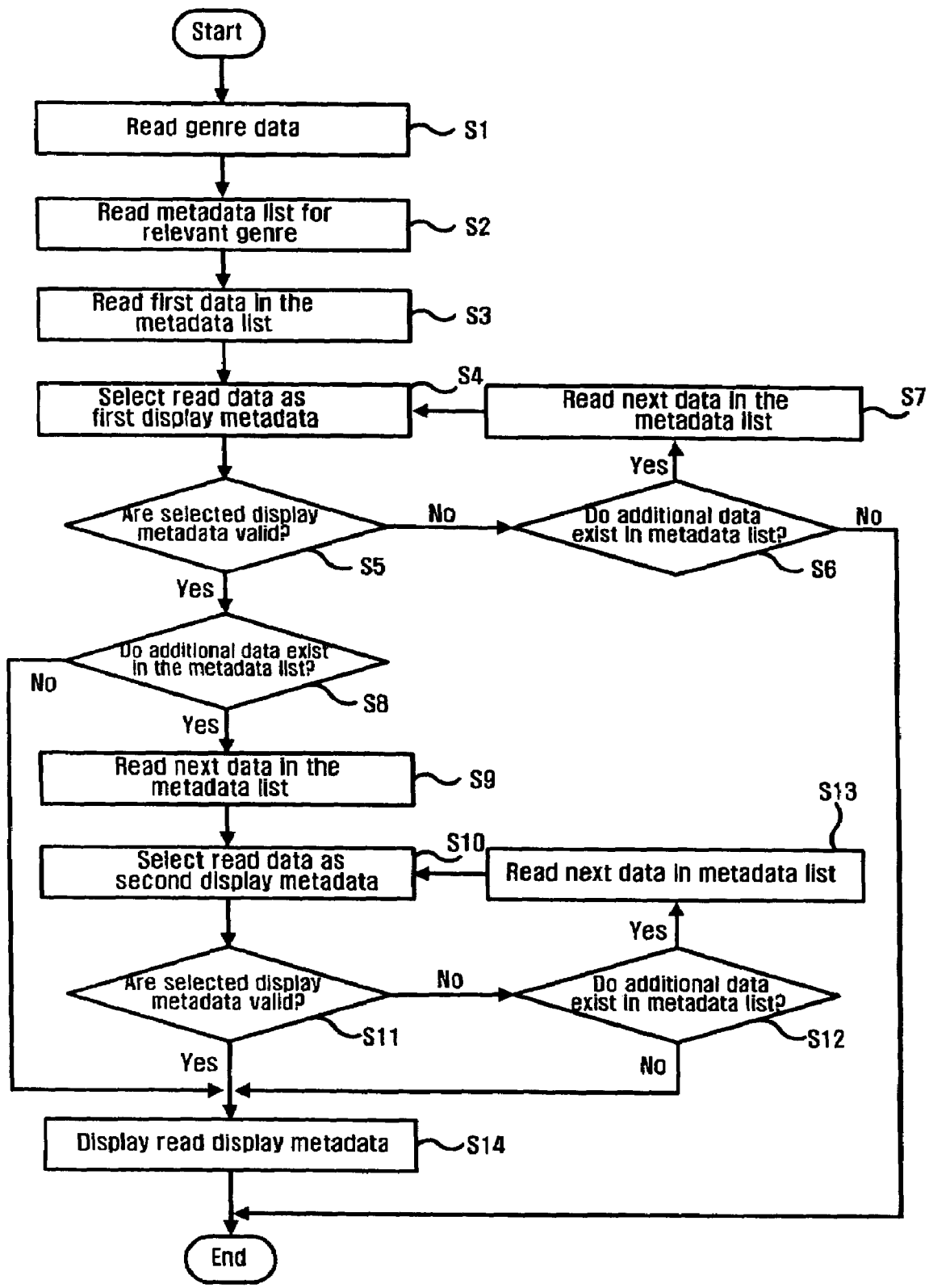

[Fig. 3]
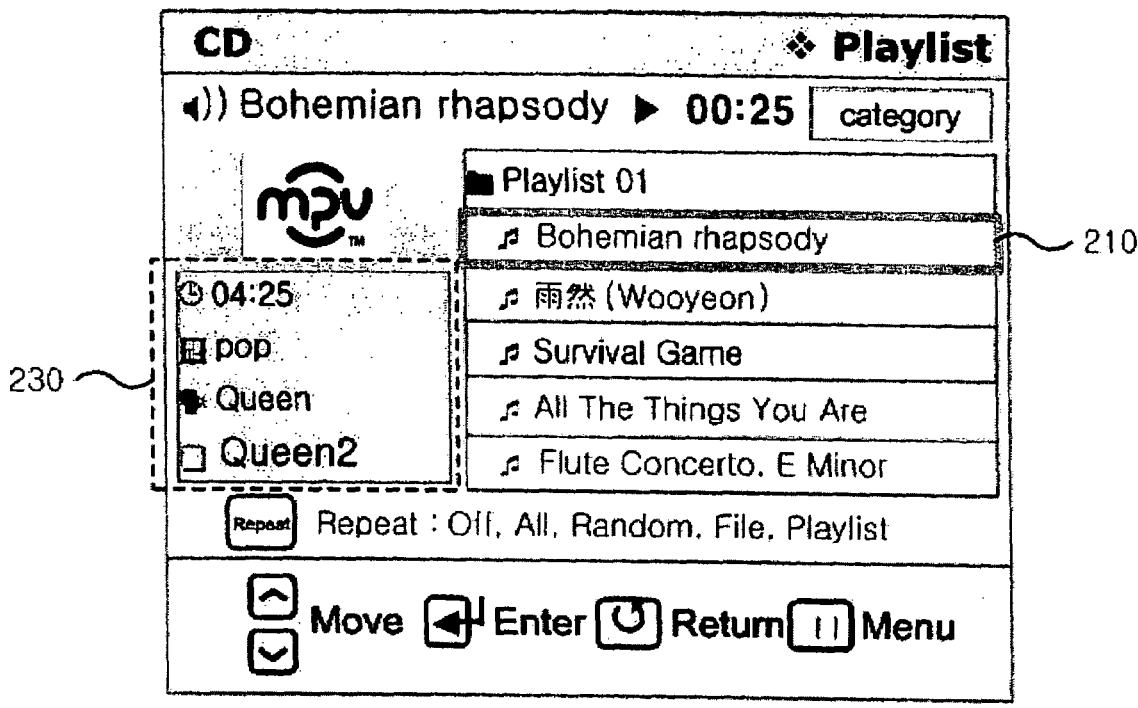
[Fig. 4]
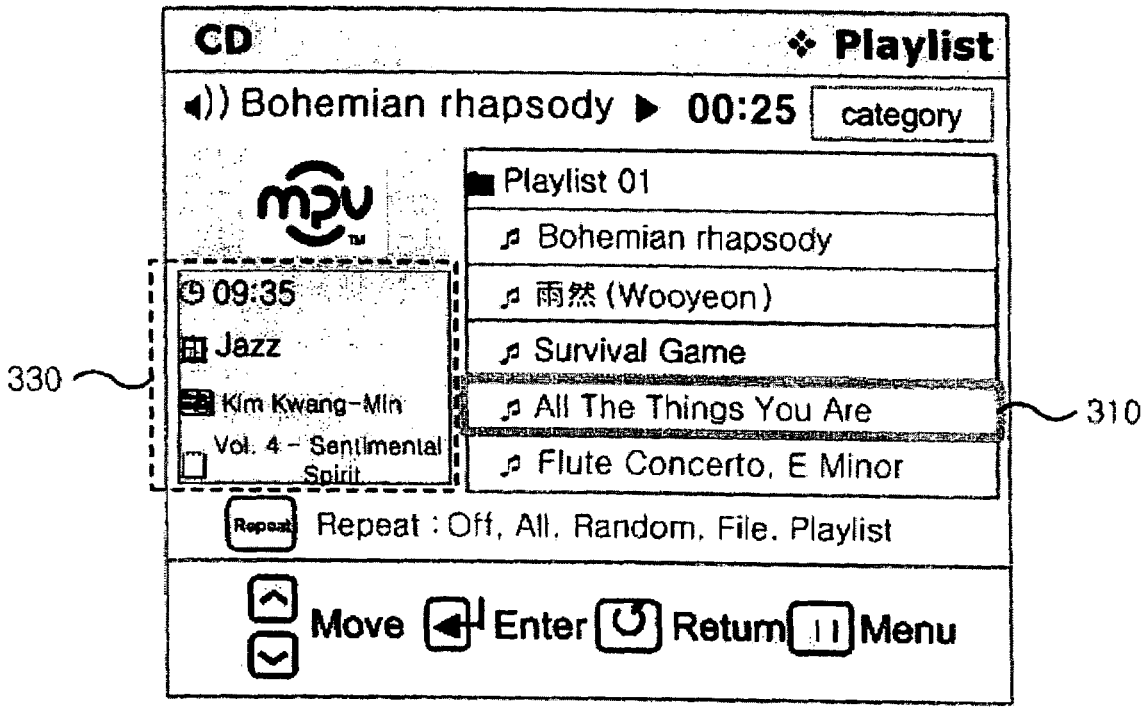

[Fig. 5]
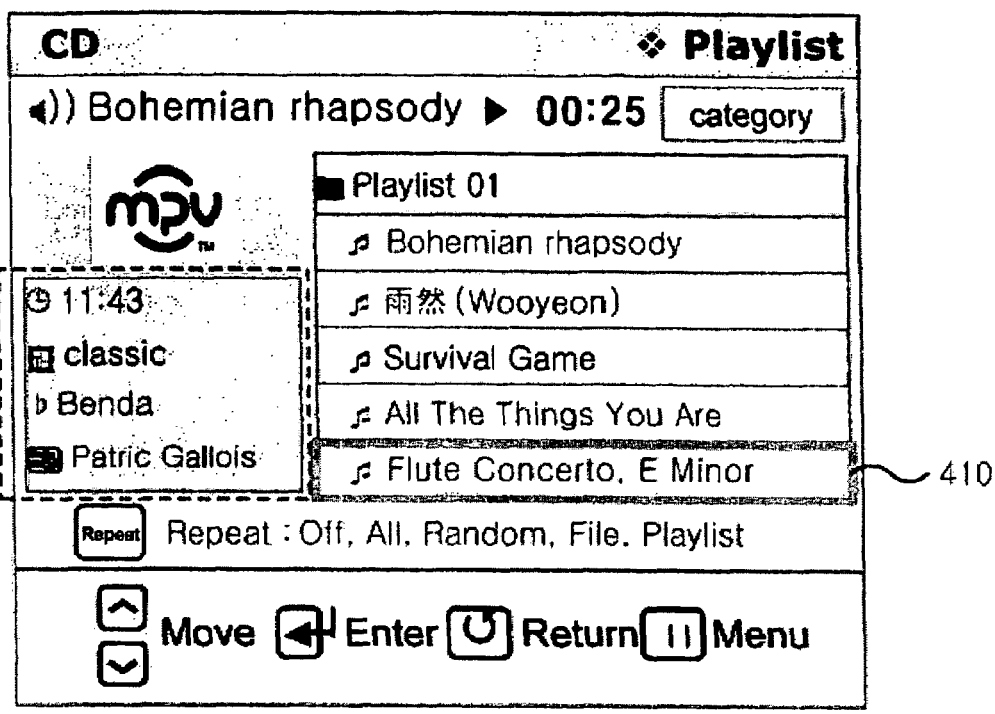

DEVICE AND METHOD FOR METADATA MANAGEMENT

TECHNICAL FIELD

The present invention relates to a device and method for managing metadata. More particularly, the present invention relates to a device and method for managing metadata wherein the priority for attributes of key metadata is defined depending on the characteristics of audio content and the metadata are selected based on the predefined priority upon the playback of the audio content recorded on a disc, so that only the key metadata can be provided to a user depending on the characteristics of the respective audio content.

BACKGROUND ART

In general, as interest in multimedia content has increased, Compact Disc (CD) and DVD (Digital Video Disc), which is the same size as a CD but with a storage capacity four times larger, have been widely developed as a storage medium for recording multimedia content thereon.

A CD/DVD (hereinafter, referred to as a 'disc') adopts and employs a variety of file systems so that a large quantity of data can be more efficiently and systematically utilized. Recently, file systems such as ISO9660, Joliet and UDF (Universal Disc Format) have been widely employed.

Among them, the UDF is a file system standard for optical media that has been developed by OSTA (Optical Storage Technology Association).

The OSTA specifies a method of arranging and describing content in a disc, by which multimedia content data created in personal computers (PCs) and recorded on a disc can be easily extracted from and manipulated in electric home appliances such as CD players and DVD players (hereinafter, referred to as 'playback devices').

According to these file systems, specific multimedia contents (e.g., audio, photo and video) and additional information used to efficiently provide a user with the specific multimedia contents are recorded on the disc.

The additional information contains application data that are composed of predetermined program sources (for example, XML data) for playing back the multimedia content recorded on the disc in accordance with the intention of the author, and metadata for the multimedia content.

This information recorded on the disc will be read by means of a playback device and played back using a predetermined application program.

That is, the predetermined application program will output audio or video data read from the disc in a play mode corresponding to the relevant data format, together with specified meta information.

By way of example, audio content contains information on an album recorded on a disc and such information as an album title, music titles and running times is output together when an audio file is played.

A user will obtain additional information on multimedia content such as audio or video file being played from such metadata. At this time, the provided additional information is not extracted based upon the characteristics of the respective multimedia content but according to a previously determined manner.

In other words, only predefined information such as album title and singer is provided from the audio content, even though its important information may vary according to the genre of the respective album.

Therefore, there is a need for a method of providing additional information by which information suitable to the multimedia content being played back can be provided more properly to a user.

DISCLOSURE OF INVENTION

A principal object of the present invention is to provide a device and method for managing metadata by which only key metadata can be selected and provided in accordance with their priorities upon playback of audio content by defining attributes of key metadata according to characteristics of the audio content.

Another object of the present invention is to provide a device and method for managing metadata by which the metadata for audio content can be utilized more efficiently by selecting and providing the respective audio content according to their priorities.

The present invention is configured in such a manner that, by defining priorities for attributes of key metadata according to characteristics of audio content, priorities of the metadata read together with the audio content upon playback thereof are set according the predefined attributes of the metadata and the metadata are then displayed according to the set priorities.

The attributes of the key metadata are arbitrarily selected to determine the priorities of the metadata for the audio content. If the priorities of the metadata are defined based on the attributes of the key metadata, a predetermined matching table is created which contains a metadata list classified by these priorities.

The attributes of the metadata can be defined, for example, according to genre and singer name for audio content.

According to an aspect of the present invention, there is provided a device for managing metadata, wherein priorities are assigned to attributes of key metadata according to characteristics of audio content, the metadata for a specific audio content are read to extract the attributes thereof, and the priorities for the read metadata are then set according the assigned priorities.

According to another aspect of the present invention, there is provided a method of managing metadata, comprising the steps of assigning priorities to attributes of key metadata according to characteristics of audio contents, reading the metadata for a specific audio content, extracting the attributes of respective metadata from the read metadata, classifying the extracted metadata attributes according to the assigned priorities and setting their priorities, and displaying the metadata for the audio content according to the set priorities.

According to a further aspect of the present invention, there is provided a method of managing metadata, comprising the steps of selecting meta data to be displayed depending upon an audio content, reading the selected meta data, and displaying the read meta data.

Hereinafter, when explaining the device and method for managing metadata according to the present invention, it has been explained that the attributes of the key metadata are classified and managed based on the genre of the audio content. However, it is also illustrative and it can be understood by those skilled in the art that various modifications and other equivalents thereof can be made to the method of classifying and providing metadata for each audio content based on other metadata for audio content.

Therefore, the true scope of the present invention should be defined by the technical spirit of the appended claims.

BRIEF DESCRIPTION OF THE DRAWINGS

The above and other objects, features and advantages of the present invention will become apparent from the following description of a preferred embodiment given in conjunction with the accompanying drawings, in which:

FIG. 1 is a diagram schematically illustrating the configuration of a device for managing metadata according to an embodiment of the present invention;

FIG. 2 is a diagram schematically illustrating a method for managing metadata according to an embodiment of the present invention; and FIGS. 3, 4 and 5 schematically show metadata screens displayed according to an embodiment of the present invention, respectively.

BEST MODE FOR CARRYING OUT THE INVENTION

FIG. 1 diagram shows the configuration of a device for managing metadata according to an embodiment of the present invention.

Referring to FIG. 1, a metadata management device comprises a control unit 110, a disc drive unit 120, a decoder 130, an input unit 140, a metadata determination unit 150, and a display unit 160.

The control unit 110 controls the overall operation of the device. The control unit reads out additional information stored in a disc through the disc drive unit 120 and provides a user with the read additional information. Further, when a specific audio content is selected, the control unit 110 allows relevant audio content data (hereinafter, referred to as 'audio data') to be read and output through the disc drive unit 120.

In addition, when the audio data are output, the control unit 110 allows specific metadata determined by the metadata determination unit 150 to be output together with the audio data.

Under the control of the control unit 110, the disc drive unit 120 picks up and outputs the audio data and additional information, which are recorded on a loaded disc, through the focusing and tracking operations.

That is, when a disc is loaded, the disc drive unit 110 reads the additional information recorded in a predetermined area and transfers the read additional information to the control unit 110, and then reads the audio data from a specified area and transfers the read audio data to the decoder 130 in response to control commands of the control unit 110.

The decoder 130 decodes and outputs audio data. More specifically, if compressed audio data are received from the disc drive unit 120, the decoder 130 decodes the audio data and outputs the decoded data as original audio signals.

The input unit 140 outputs a specific selection signal according to buttons selected by a user. More specifically, if the user selects a specific button, the input unit 140 generates its corresponding selection signal and transmits the signal to the control unit 110.

For example, if a user selects a button such as 'play', 'skip', 'pause', 'stop' or 'sound control' button, the input unit 140 generates a selection signal corresponding to the selected button and transmits the generated signal to the control unit 110 so that the control unit 110 can control the operation of a predetermined application for playback of multimedia content recorded on a storage medium in accordance with to the selection signal being input.

Under the control of the control unit 110, the metadata determination unit 150 detects the metadata for specific audio data from the additional information, selects the detected metadata through a matching table according to a predetermined priority, and then outputs the selected metadata to the control unit 110.

By way of example, if an appropriate priority is set for each audio content based on the genre thereof and the metadata are then provided according to the priority, the following matching table, i.e. Table 1, is established according to genre.

TABLE 1

| Genre | List of metadata | | | |
| | 1 | 2 | 3 | 4 |
|---|---|---|---|---|
| Folk | Singer | Album title | Composer | Songwriter |
| Pop | Singer | Album title | Composer | Songwriter |
| Classic | Composer | Player | Conductor | Album title |
| Jazz | Player | Album title | Arranger | Composer |

Through the matching table as configured above, the metadata determination unit 150 selects only the metadata with higher priority among the metadata for the audio data selected by the user.

In other words, when the user makes a play list by selecting specific audio data according to his/her preference and then plays back the audio data in the play list, the appropriate metadata can be selected and provided in accordance with the audio data being played.

The display unit 160 displays the control process made by the control unit 110 and the results thereof so that the user can view them. More specifically, the display unit 160 displays predetermined application programs for use in the playback of audio data recorded on the loaded disc and also displays the additional information received from the control unit 110 by using the application program.

The additional information includes selection menus by category for audio data recorded on the disc, play lists, and predetermined metadata selected by the metadata determination unit 150.

Hereinafter, a method of managing metadata using the metadata management device so configured according to the present invention will be described in detail with reference to the accompanying drawings.

FIG. 2 schematically illustrates a process of managing metadata according to an embodiment of the present invention.

Referring to FIG. 2, if a specific audio content is selected from a play list made by a user, the control unit 110 reads audio data corresponding to the selected audio content through the disc drive unit 120 and controls the operations for configuring the metadata corresponding to the audio content.

First, the metadata determination unit 150 reads genre data corresponding to the selected audio content (S1) and reads a metadata list corresponding to the genre from the matching table (S2).

Then, the metadata determination unit 150 classifies the metadata for the selected audio contents based on the read metadata list and reads the first data in the metadata list with highest priority (S3).

Next, the read first data are selected as the first metadata to be displayed (S4), and it is then determined whether the first metadata to be displayed is valid (S5).

If it is determined that the first metadata are not valid, it is further determined whether there are any additional data in the metadata list (S6).

If it is determined that additional data exist, the next data in the metadata list are read and the process is then return to a routine in which the read data are selected as the first metadata to be displayed (S7). If it is determined that additional data do not exist, the process terminates.

If it is determined that the selected first metadata to be displayed are valid, it is further determined whether there are any additional data in the metadata list (S8).

If it is determined that additional data exist, the next data in the metadata list are read (S9) and selected as the second metadata to be displayed (S10).

Then, it is further determined whether the selected second metadata are valid (S11).

If it is determined that the selected second metadata to be displayed are not valid, it is also determined whether there are any additional data in the metadata list (S12). If it is determined that additional data exist, the next data in the metadata list are read and the process returns to a routine in which the read data is selected as the second metadata to be displayed (S13).

If it is determined that the selected metadata to be displayed are valid or additional data do not exist in the metadata list, the read metadata are displayed through the display unit 160 (S14).

Now, the method of managing the metadata according to the present invention will be more specifically described with reference to the accompany drawings, by way of example.

FIGS. 3, 4 and 5 schematically show metadata screens displayed according to an embodiment of the present invention, respectively.

A user selects specific audio contents to make a play list according to his/her preference, and selects an audio content, which he/she wishes to play back, from entries in the play list.

As shown in FIG. 3, if the user selects 'Bohemian rhapsody' 210 from Playlist 01, the control unit 110 reads relevant audio data through the disc drive unit 120 according to the user's selection and transmits information on the selected audio content to the metadata determination unit 150.

Accordingly, the metadata determination unit 150 classifies metadata useful for the selected audio content and then selects the metadata to be displayed.

If the matching table such as Table 1 is used in classifying the metadata, a metadata list (1: singer, 2: album, 3: composer, 4: songwriter) corresponding to a 'pop' genre for the selected audio content is read.

Then, the metadata for the selected audio content (genre: pop, singer: Queen, album title: Queen2, composer: Queen (Freddie Mercury), songwriter: Queen) are classified according to the read metadata list, and the metadata are then read and selected as the display metadata according to their priorities.

If only two metadata should be displayed, the singer and album title, i.e. 'signer: Queen, album title: Queen2' are selected as the display metadata according to the priority for the relevant genre (e.g., 'pop') and then displayed on an addition information region 230 of the display unit 160.

Further, if both 'Wooyeon' and 'Survival Game' in Playlist 01 are selected, respective singers and album titles are selected as the display metadata because each of the selected audio contents has a 'folk' genre. Then, the display metadata are displayed when playing back the relevant audio data (it is not shown in this figure).

As shown in FIG. 4, if 'All The Things You Are' 310 in Playlist 01 is selected, the metadata list for the 'Jazz' genre of the selected audio content is read from the matching table.

The metadata for the selected audio content (genre: Jazz, player: Kim Kwang-Min, album: Vol. 4—Sentimental Spirit) are classified based on the read metadata list, and the first and second data in the metadata list are read and selected as the display metadata.

Accordingly, the selected display metadata, i.e. 'player: Kim Kwang-Min, album: Vol. 4—Sentimental Spirit', are displayed on an additional information region 330 in the display unit 160.

As shown in FIG. 5, if 'Flute Concerto, E Minor' 410 in Playlist 01 is selected, the display metadata (i.e., 'composer: Benda, player: Patric Gallois') are selected using both a metadata list for the relevant genre and metadata for the selected audio content.

Then, the selected display metadata are displayed on an additional information region 430 in the display unit 160.

Through the aforementioned process, the user can receive the metadata appropriately selected according to the respective audio content being played.

INDUSTRIAL APPLICABILITY

According to the present invention, there is an advantage in that major information on respective audio content can be efficiently provided to a user based on the metadata that are classified and selected according to the respective audio content.

Although the preferred embodiment of the present invention has been disclosed for illustrative purposes, those skilled in the art will appreciate that various modifications, additions and substitutions are possible, without departing from the scope and spirit of the present invention as disclosed in the accompanying claims.

The invention claimed is:

1. A device for managing metadata comprising:
   a disc drive unit that picks up and outputs audio content and metadata recorded on a disc, the audio content associated with the metadata,
   wherein priorities are assigned to metadata of audio contents according to a characteristic of the audio contents, the characteristic of the audio contents based on a predetermined metadata of the audio contents, and
   wherein metadata of the audio content are read from the disc, and priorities for the read metadata associated with the audio content are assigned to the read metadata according to the priorities assigned to audio contents having a characteristic that is the same as a characteristic of the audio content read from the disc, and
   wherein the read metadata are displayed according to the set-priorities of the metadata.

2. The device as claimed in claim 1, wherein the device further comprises:
   a control unit that controls the operations of playing back the audio content read by the disc drive unit according to the selection of a user and that provides the user with the metadata for the audio content being played;
   a metadata determination unit that receives the metadata for the audio content from the control unit to extract the metadata and that determines the priorities for the metadata according to the priorities assigned to audio contents having the characteristic that is the same as the characteristic of the audio content; and
   a display unit that displays a predetermined application program for playing back the audio content under control of the control unit and that displays predetermined metadata determined by the metadata determination unit through the application program.

3. The device as claimed in claim 2, further comprising:
   a decoder that decodes the audio content read by the disc drive unit and that outputs the decoded audio content in the form of an original audio signal; and
   an input unit that generates a predetermined selection signal according to the user's selection and that outputs the generated signal to the control unit.

4. The device as claimed in claim 1, wherein when the priorities for the metadata of the audio content are set according to the priorities assigned to audio contents having the characteristic that is the same as the characteristic of the audio content, a predetermined matching table is created which contains a metadata list associating priorities to the respective metadata.

5. A method of managing metadata on a media player by a media player, comprising:

assigning priorities to metadata of audio contents according to a characteristic of the audio contents, the characteristic of the audio contents based on a predetermined metadata of the audio contents;

reading metadata of a specific audio content;

extracting the read metadata of the specific audio content;

assigning the extracted metadata priorities according to priorities assigned to audio contents having the characteristic that is the same as the characteristic of the specific audio content and setting the priorities of the extracted metadata to be the same as the priorities assigned to audio contents having a characteristic that is the same as a characteristic of the specific audio content; and displaying, by a playback device, the metadata for the specific audio content according to the assigned priorities.

6. The method as claimed in claim 5, wherein the characteristic of the audio contents is a genre of the audio contents, and wherein the priorities of the attributes of the metadata are assigned based on the genre of the audio contents.

7. The method as claimed in claim 5, wherein assigning the priorities for the extracted metadata according to the priorities assigned to audio contents having the characteristic that is the same as the characteristic of the specific audio content comprises creating a predetermined matching table that contains a metadata list associating priorities to the respective metadata, and wherein the setting the priorities for the extracted metadata comprises setting the priority of the extracted metadata based on the created matching table.

8. The method as claimed in claim 5, wherein the displaying the metadata for the specific audio content comprises displaying the metadata according to the set priorities.

9. A method of managing metadata on a media player by a media player, comprising:

selecting metadata of an audio content to be displayed, the metadata of the audio content selected based on a characteristic of the audio content, the characteristic based on a predetermined metadata of the audio content;

reading the selected metadata; and displaying, by a playback device, the read metadata according to priorities of the read metadata, wherein the priorities of the metadata of the audio content are assigned to the read metadata based on priorities assigned to audio contents having a characteristic that is the same as a characteristics of the audio content.

10. The method as claimed in claim 9, wherein the metadata are displayed when the audio content is selected.

11. The method as claimed in claim 9, wherein the reading the metadata comprises:

reading metadata of the audio content; and classifying the metadata of the audio content to be displayed according to the priorities of the read metadata.

12. The device as claimed in claim 1, wherein the metadata comprise at least one of a singer, an album title, a composer, a songwriter, a player, a conductor, and an arranger.

13. The device as claimed in claim 1, wherein the priorities of the metadata of the audio content are automatically assigned to be the same as priorities of the metadata of the audio contents having the characteristic that is the same as the characteristic of the audio content.

14. The device as claimed in claim 4, wherein the read metadata are displayed according to the set priorities for the read metadata, and wherein the read metadata comprise at least one of a singer, an album title, a composer, a songwriter, a player, a conductor, and an arranger.

* * * * *

UNITED STATES PATENT AND TRADEMARK OFFICE
CERTIFICATE OF CORRECTION

PATENT NO. : 7,620,467 B2  Page 1 of 1
APPLICATION NO. : 10/559432
DATED : November 17, 2009
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 570 days.

Signed and Sealed this

Twenty-sixth Day of October, 2010

David J. Kappos
*Director of the United States Patent and Trademark Office*